United States Patent
Tajima et al.

(10) Patent No.: US 10,472,239 B2
(45) Date of Patent: Nov. 12, 2019

(54) CARBONACEOUS MATERIAL FOR ELECTRONIC MATERIALS

(71) Applicant: KURARAY CO., LTD., Kurashiki-shi (JP)

(72) Inventors: Kyomi Tajima, Kurashiki (JP); Hidetoshi Kudo, Chiyoda-ku (JP); Taketoshi Okuno, Kurashiki (JP); Hideharu Iwasaki, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/735,006

(22) PCT Filed: Jun. 9, 2016

(86) PCT No.: PCT/JP2016/067182
§ 371 (c)(1),
(2) Date: Dec. 8, 2017

(87) PCT Pub. No.: WO2016/199840
PCT Pub. Date: Dec. 15, 2016

(65) Prior Publication Data
US 2018/0162733 A1    Jun. 14, 2018

(30) Foreign Application Priority Data
Jun. 12, 2015 (JP) .................. 2015-119454

(51) Int. Cl.
*C01B 32/05* (2017.01)
*H01M 4/587* (2010.01)
(Continued)

(52) U.S. Cl.
CPC ........... *C01B 32/05* (2017.08); *H01G 9/0029* (2013.01); *H01G 9/042* (2013.01); *H01G 11/34* (2013.01);
(Continued)

(58) Field of Classification Search
CPC ...... C01B 32/05; H01G 9/0029; H01G 9/042; H01G 11/32; H01G 11/34; H01G 11/86;
(Continued)

(56) References Cited

U.S. PATENT DOCUMENTS

| 6,303,249 B1 | 10/2001 | Sonobe et al. |
| 2002/0114126 A1 | 8/2002 | Hirahara et al. |

(Continued)

FOREIGN PATENT DOCUMENTS

| JP | 10-21919 A | 1/1998 |
| JP | 2002-33249 A | 1/2002 |

(Continued)

OTHER PUBLICATIONS

International Search Report dated Aug. 16, 2016 in PCT/JP2016/067182 filed Jun. 9, 2016.

(Continued)

*Primary Examiner* — Richard M Rump
(74) *Attorney, Agent, or Firm* — Oblon, McClelland, Maier & Neustadt, L.L.P.

(57) ABSTRACT

The present invention relates to a carbonaceous material derived from a plant starting material, which is useful for electronic materials for conductive materials, capacitor electrodes, storage battery electrodes, nonaqueous electrolyte secondary battery electrodes and the like. The present invention relates to a carbonaceous material for electronic materials, which is obtained by burning a carbon precursor derived from palm husk, and which is configured such that: the potassium content in the carbonaceous material is 100 ppm or less; the calcium content in the carbonaceous material is 100 ppm or less; and the elemental oxygen content in the carbonaceous material is 0.25% by weight or less.

5 Claims, 1 Drawing Sheet

(51) Int. Cl.
  *H01G 9/00* (2006.01)
  *H01G 9/042* (2006.01)
  *H01G 11/34* (2013.01)
  *H01G 11/44* (2013.01)
  *H01G 11/86* (2013.01)
  *H01M 10/0525* (2010.01)

(52) U.S. Cl.
  CPC .............. *H01G 11/44* (2013.01); *H01G 11/86* (2013.01); *H01M 4/587* (2013.01); *H01M 10/0525* (2013.01); *C01P 2006/80* (2013.01)

(58) Field of Classification Search
  CPC .. H01G 11/44; H01M 10/0525; H01M 4/587; C01P 2006/80
  See application file for complete search history.

(56) References Cited

U.S. PATENT DOCUMENTS

| | | |
|---|---|---|
| 2010/0069507 A1 | 3/2010 | Tabata et al. |
| 2012/0202033 A1 | 8/2012 | Chang et al. |
| 2013/0194721 A1 | 8/2013 | Cho et al. |
| 2015/0188137 A1 | 7/2015 | Komatsu et al. |
| 2015/0263347 A1 | 9/2015 | Imaji et al. |

FOREIGN PATENT DOCUMENTS

| | | | |
|---|---|---|---|
| JP | 2008-273816 A | 11/2008 | |
| JP | 2013-23405 A | 2/2013 | |
| JP | 2013-157603 A | 8/2013 | |
| JP | WO 2014/034857 A1 | 3/2014 | |
| JP | WO 2014/038491 A1 | 3/2014 | |
| JP | 2014-511322 A | 5/2014 | |
| WO | WO-2014034858 A1 * | 3/2014 | ............ H01M 4/587 |

OTHER PUBLICATIONS

International Preliminary Report on Patentability and Written Opinion dated Dec. 21, 2017 in PCT/JP2016/067182 (submitting English translation only).

* cited by examiner

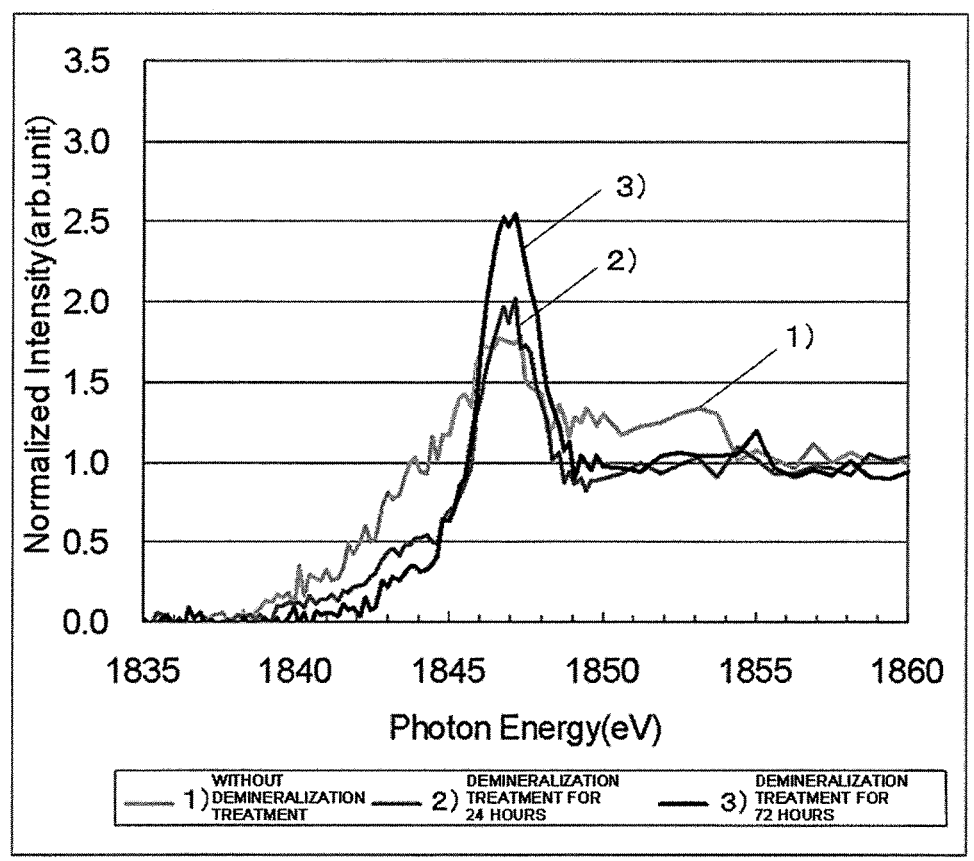

CARBONACEOUS MATERIAL FOR ELECTRONIC MATERIALS

TECHNICAL FIELD

This patent application claims priority to Japanese Patent Application No. 2015-119454 (filed on Jun. 12, 2015), which is incorporated by reference herein in its entirety.

The present invention relates to a carbonaceous material derived from a plant raw material useful for electronic materials for conductive materials, capacitor electrodes, condenser electrodes, storage battery electrodes, nonaqueous electrolyte secondary battery electrodes, etc.

BACKGROUND ART

Carbonaceous materials are used in various applications such as conductive materials, capacitor electrodes, condenser electrodes, storage battery electrodes, nonaqueous electrolyte secondary battery electrodes, etc. and are fields and materials expected to be further developed in the future. These carbonaceous materials are conventionally manufactured from raw materials such as coconut shell, coal coke, coal or petroleum pitch, and furan resin or phenolic resin. It is recently expected that the use of fossil fuel resources becomes difficult in the future due to influences on the global environment and a price rise due to a decrease in amount of deposit.

Therefore, carbonaceous materials manufactured by using natural materials as raw materials are attracting attention as materials friendly to the global environment. However, natural materials contain various metals necessary for maintaining life activities of organisms. Therefore, if a naturally-derived carbonaceous material is used for an electronic material, such metal may act as impurities, leading to occurrence of an electric failure. Specifically, using the material for a capacitor or a storage battery causes problems, such as a short circuit due to the metal eluted and precipitated in the process of charging and discharging, or an increased internal resistance and a reduced capacity due to occurrence of a side reaction with an electrolytic solution etc. based on metallic impurities in the carbonaceous material. However, few technological developments have been made on methods of actively removing and refining metal derived from plants.

Under such a situation, a method is proposed in Japanese Laid-Open Patent Publication No. 2008-273816 (Patent Document 1) for refining a carbide together with a mineral acid such as hydrochloric acid or a base such as sodium hydroxide, and a method is proposed in International Publication No. 2014-038491 (Patent Document 2) for removing potassium and calcium by performing a demineralization treatment of organic substances derived from plants such as coffee beans and coconut shells in an acidic solution before detarring.

However, the method proposed in Patent Document 1 is a method of carbonizing a plant-derived material at 800° C. to 1400° C. and then treating the obtained carbide with an acid or an alkali, so that a metal component combines with carbon during carbonization and therefore is not sufficiently removed. Additionally, in Patent Document 1, a highly corrosive poisonous substance, i.e., hydrofluoric acid, is added in an excessive amount to a silicon compound to remove silicon after combination with carbon. However, hydrofluoric acid has an insufficient effect of removing magnesium and calcium and hardly removes phosphorus. The method of Patent Document 1 also has a problem that impurities in plant raw materials vary in content depending on the season and region and are difficult to smooth for industrial raw materials.

In the method proposed in Patent Document 2, if coconut shell is used for a plant-derived organic substance, the obtained carbonaceous material has a large amount of absorbed moisture. For example, using such a carbonaceous material for an electrode of a lithium ion battery causes problems such as a reduction in absorbed amount of lithium ions into the carbonaceous material and an increased possibility of self-discharge due to reaction of the adsorbed moisture with nitrogen atoms of the carbonaceous material and reaction of the adsorbed moisture with lithium ions.

PRIOR ART DOCUMENTS

Patent Documents

Patent Document 1: Japanese Laid-Open Patent Publication No. 2008-273816

Patent Document 2: International Publication No. 2014-038491

SUMMARY OF THE INVENTION

Problem to be Solved by the Invention

An object of the present invention is to provide a carbonaceous material for electronic materials derived from a plant raw material, or particularly coconut shell, having contents of metallic elements and/or nonmetallic elements and an amount of moisture absorption sufficiently reduced.

Means for Solving Problem

The present inventors found that immersing particularly a coconut shell raw material among plant raw materials in an organic acid aqueous solution reduces contents of metallic elements and/or nonmetallic elements in a carbon precursor and converts impurities such as compounds containing metallic elements and/or compounds containing nonmetallic elements in the carbon precursor into an electrochemically inactive form. The present inventors also found that by calcining a carbon precursor derived from a plant raw material as a mixture with a volatile organic substance in an inert gas atmosphere at 800° C. to 1400° C. to reduce an oxygen element content in a carbonaceous material, an amount of moisture absorption in the carbonaceous material is reduced.

Therefore, the present invention includes the followings.

[1] A carbonaceous material that is a carbide of a carbon precursor derived from coconut shell, wherein the carbonaceous material has a potassium content of 100 ppm or less and a calcium content of 100 ppm or less, and wherein the carbonaceous material has an oxygen element content of 0.25 wt % or less.

[2] The carbonaceous material according to [1], wherein the carbonaceous material has a magnesium content of 50 ppm or less.

[3] The carbonaceous material according to [1] or [2], wherein the carbonaceous material has a phosphorus content of 150 ppm or less.

[4] A method of manufacturing a carbonaceous material according to any one of [1] to [3], the method comprising the steps of:

reducing contents of metallic elements and/or nonmetallic elements in coconut shell by immersing the coconut shell in an organic acid aqueous solution; and subsequently heating the coconut shell reduced in contents of metallic elements and/or nonmetallic elements at 250 to 800° C. for carbonization to obtain a carbon precursor derived from the coconut shell.

[5] The method according to [4], further comprising a step of calcining a mixture of the carbon precursor derived from the coconut shell and a volatile organic substance in an inert gas atmosphere at 800° C. to 1400° C. to obtain the carbonaceous material.

[6] An electronic material that is a carbide of a carbon precursor derived from coconut shell, wherein the carbide has a potassium content of 100 ppm or less and a calcium content of 100 ppm or less, and wherein the carbide has an oxygen element content of 0.25 wt % or less.

Effect of the Invention

The carbonaceous material for electronic materials of the present invention (hereinafter also referred to as the carbonaceous material of the present invention) has reduced contents of metallic elements such as potassium, magnesium, and calcium and/or nonmetallic elements such as phosphorus, has impurities containing metallic elements and/or nonmetallic elements in an electrochemically inactive form, and therefore can suitably be used as a raw material for electronic materials. The carbonaceous material for electronic materials of the present invention has a small oxygen element content and therefore can reduce an amount of moisture absorption adversely affecting electronic materials, for example.

BRIEF DESCRIPTION OF DRAWINGS

FIG. 1 is a diagram of XANES spectra of Si compounds in carbonaceous materials obtained by calcining a carbon precursor derived from coconut shell at 1270° C.

MODES FOR CARRYING OUT THE INVENTION

A carbonaceous material of the present invention is obtained by calcining a carbon precursor derived from a plant raw material. The plant material used in the present invention is not particularly limited and can be rice husks, coffee grounds after extraction, coconut shell, etc.

In the present invention, coconut shell is used as a plant raw material from the viewpoint of availability and a reduction effect on metallic element contents. The carbonaceous material of the present invention is a carbonaceous material obtained by calcining a carbon precursor derived from coconut shell and is a carbonaceous material for electronic materials having a potassium content of 100 ppm or less and a calcium content of 100 ppm or less in the carbonaceous material and an oxygen element content of 0.25 wt % or less in the carbonaceous material. In other words, the carbonaceous material of the present invention is a carbonaceous material that is a carbide of a carbon precursor derived from coconut shell and is a carbonaceous material for electronic materials having a potassium content of 100 ppm or less and a calcium content of 100 ppm or less in the carbonaceous material and an oxygen element content of 0.25 wt % or less in the carbonaceous material. Although not particularly limited, examples of the coconut shell can include coconut shells of coconut trees, palm trees, etc.

The coconut shell to be used is crushed shell portions of coconut seeds called coconut shell chips generally used as raw materials of fuel such as coconut charcoal, activated carbon, etc. The coconut shell chips are mainly composed of a portion with a dense tissue called shell and therefore can suitably be used as a carbon precursor.

The carbonaceous material of the present invention has a potassium content of 100 ppm or less and a calcium content of 100 ppm or less in the carbonaceous material. Therefore, the carbonaceous material of the present invention can suitably be used as an electronic material. The potassium content in the carbonaceous material of the present invention is preferably 60 ppm or less, more preferably 30 ppm or less. The calcium content in the carbonaceous material of the present invention is preferably 50 ppm or less, more preferably 25 ppm or less.

In a preferable embodiment of the present invention, a magnesium content in the carbonaceous material is 50 ppm or less, preferably 30 ppm, more preferably 10 ppm or less. In another preferable embodiment of the present invention, a phosphorus content in the carbonaceous material is 150 ppm or less, preferably 140 ppm or less, more preferably 130 ppm or less.

In the present invention, the contents of metallic elements and/or nonmetallic elements in the carbonaceous material can be measured by using an X-ray fluorescence spectrometer (e.g., ZSX Primus μ manufactured by Rigaku Corporation) according to a measurement method described later.

The carbonaceous material of the present invention has an oxygen element content of 0.25 wt % or less, preferably 0.24 wt % or less, according to analysis values obtained from elemental analysis. A smaller oxygen element content is more favorable for the carbonaceous material and it is more preferable that the oxygen element is substantially not contained. As used herein, "substantially not contained" means that the content is equal to or less than $10^{-6}$ wt %, which is the detection limit of an elemental analysis method (inert gas fusion-thermal conductimetry) described later. An excessively large oxygen element content not only attracts oxygen and moisture in the air to increase a probability of reaction with the carbonaceous material but also prevents easy desorption when water is adsorbed, resulting in an increased amount of moisture absorption, which is not preferable.

In the carbonaceous material of the present invention, an amount of moisture absorption is preferably 15,000 ppm or less, more preferably 13,500 ppm or less, further preferably 12,000 ppm or less. The amount of moisture absorption of the carbonaceous material can be measured by using Karl Fischer, for example.

The carbonaceous material of the present invention can be obtained by calcining a carbon precursor derived from a plant raw material. The carbon precursor derived from a plant raw material can be manufactured by a method of immersing a plant raw material in an organic acid aqueous solution to reduce contents of metallic elements and/or nonmetallic elements in the plant raw material and then heating the material at 250 to 800° C. for carbonization. Therefore, a method of manufacturing the carbonaceous material of the present invention is a manufacturing method comprising a step of reducing the contents of metallic elements and/or nonmetallic elements in coconut shell by immersing the coconut shell in an organic acid aqueous solution, and a step of subsequently heating the coconut shell reduced in contents of metallic elements and/or nonmetallic elements at 250 to 800° C. for carbonization to obtain a carbon precursor derived from the coconut shell. In the present invention, reducing the contents of metallic elements and/or nonmetallic elements in a plant raw material by immersing the plant raw material in an organic acid aqueous solution will hereinafter be referred to as demineralization. The step of reducing the contents of metallic elements and/or nonmetallic elements in a plant raw material by immersing the plant raw material in an organic acid aqueous solution will hereinafter be referred to as a demineralization step.

Generally, plants contain large amounts of alkali metallic and alkaline earth metallic elements such as potassium, magnesium, and calcium and nonmetallic elements such as phosphorus. However, carbonization of a carbon precursor derived from a plant containing these metals may result in decomposition of a necessary carbonaceous component during carbonization. Additionally, since nonmetallic elements such as phosphorus are easily oxidized, a degree of oxidation is changed at a surface of the carbide and the properties of the carbide are significantly changed, which is not preferable.

A refining method performed after carbonization of the plant raw material may not be able to sufficiently remove phosphorus, calcium, and magnesium. Furthermore, a demineralization execution time and a residual amount of metallic elements and/or nonmetallic elements in the carbide after demineralization considerably differ depending on the contents of metallic elements and nonmetallic elements in the carbon precursor. Therefore, it is preferable to sufficiently remove the contents of metallic elements and/or nonmetallic elements in the plant raw material before carbonizing the plant raw material.

From such a viewpoint, in the present invention, preferably, the carbon precursor with a fibrous portion removed is immersed in the organic acid aqueous solution so as to reduce the contents of metallic elements and/or nonmetallic elements in the carbon precursor.

By performing the demineralization treatment, the impurities such as a compound containing a metallic element and a compound containing a nonmetallic element can be converted into an electrochemically inactive form. A chemically-combined form of impurities can be confirmed, for example, by analysis using XPS, XAFS, etc. In consideration of measurement range and measurement accuracy of trace metal, it is more preferable to use XAFS.

For example, in the case of the Si species, although $SiO_2$ is in an electrochemically inactive form, if the carbon precursor is calcined at a temperature of 1100 to 1400° C., a portion of $SiO_2$ is thermally reduced by carbon, and electrochemically active $SiO_x$ and/or a compound having the Si—O—C bond are generated. However, if the demineralization treatment is performed, $SiO_2$ is converted into a hardly thermally-reduced form, so that the generation of electrochemically active $SiO_x$ and/or a compound having the Si—O—C bond can be suppressed.

FIG. 1 shows XANES spectra of Si compounds contained in carbonaceous materials obtained by calcining a carbon precursor derived from coconut shell at 1270° C. (soft X-ray XAFS beamline (BL-10) of Ritsumeikan University SR (Synchrotron Radiation) Center, according to the analysis by Toshiaki Ota, Masahiro Ogawa, et al.). In FIG. 1, 1) shows the XANES spectrum of the carbonaceous material obtained in Comparative Example 1 described later, i.e., the carbonaceous material obtained when the demineralization treatment of coconut shell was not performed. In FIG. 1, 2) shows the XANES spectrum of the carbonaceous material obtained in Example 2 described later, i.e., the carbonaceous material obtained when the demineralization treatment (treatment time: 24 hours) was performed by using a citric acid aqueous solution as the organic acid aqueous solution. In FIG. 1, 3) shows the XANES spectrum of the carbonaceous material obtained in Example 1 described later, i.e., the carbonaceous material obtained when the demineralization treatment (treatment time: 24 hours×3) was performed by using a citric acid aqueous solution. While peaks are mainly located around 1847 eV of $SiO_2$ in 2) and 3), a large shoulder is seen around 1843.5 eV and a change to a broad peak is made on the low-energy side including a compound with the Si—O—C bond (about 1843.5 eV) in 1). From this result, it can be seen that the thermal reduction of Si compounds was suppressed by the citric acid treatment.

In the demineralization treatment, the organic acid aqueous solution is used for removing alkali metallic elements, alkaline earth metallic elements, and/or nonmetallic elements from the plant-derived carbon precursor. Preferably, the organic acid does not contain an element serving as a source of impurities such as phosphorus, sulfur, and halogen. The organic acid not containing an element such as phosphorus, sulfur, and halogen is advantageous because even if water washing after demineralization is eliminated and the organic acid remains in the coconut shell chips to be carbonized, a carbide suitably usable as a carbon material is obtained. The organic acid is advantageous because a waste liquid treatment of the organic acid after use can relatively easily be performed without using a special apparatus.

Examples of the organic acid include saturated carboxylic acids such as formic acid, acetic acid, propionic acid, oxalic acid, tartaric acid, and citric acid, unsaturated carboxylic acids such as acrylic acid, methacrylic acid, maleic acid, and fumaric acid, aromatic carboxylic acids such as benzoic acid, phthalic acid, and naphthoic acid. From the viewpoints of availability, corrosion due to acidity, and influence on the human body, acetic acid, oxalic acid, and citric acid are preferable.

In the present invention, the organic acid is usually mixed with an aqueous solution and used as an organic acid aqueous solution from the viewpoints of solubility of eluted metallic compounds, treatment of waste, environmental compatibility, etc. Examples of the aqueous solution include water, a mixture of water and a water-soluble organic solvent, etc. Examples of the water-soluble organic solvent include alcohols such as methanol, ethanol, propylene glycol, and ethylene glycol.

The concentration of the acid in the organic acid aqueous solution is not particularly limited, and the organic acid aqueous solution can be used with the concentration adjusted depending on a type of acid to be used. In the present invention, the organic acid aqueous solution to be used usually has an acid concentration within a range of 0.001 wt % to 20 wt %, more preferably 0.01 wt % to 18 wt %, further preferably 0.02 wt % to 15 wt %, based on the total amount of the organic acid aqueous solution. When the acid concentration is within the range described above, an appropriate elution rate of metallic and/or nonmetallic elements can be achieved, so that the demineralization can be performed in a practical time. Additionally, since a residual amount of acid in the carbon precursor is reduced, an influence on subsequent products is also reduced.

The pH of the organic acid aqueous solution is preferably 3.5 or less, preferably 3 or less. When the pH of the organic acid aqueous solution does not exceed the value described above, metallic elements and/or nonmetallic elements can efficiently be removed without lowering a rate of dissolution of metallic elements and/or nonmetallic elements into the organic acid aqueous solution.

Although not particularly limited, the temperature of the organic acid aqueous solution at the time of immersion of the plant raw material is preferably in the range of 45° C. to 120° C., more preferably 50° C. to 110° C., further preferably 60° C. to 100° C. The temperature of the organic acid aqueous solution at the time of immersion of the plant raw material is preferably within the range described above because the decomposition of the acid to be used is suppressed and the elution rate of metallic elements and/or nonmetallic elements is achieved such that the demineralization can be performed in a practical time. The temperature within the range is preferable also because the demineralization can be performed without using a special apparatus.

The time of immersion of the plant raw material in the organic acid aqueous solution can appropriately be adjusted depending on the acid to be used. In the present invention, from the viewpoint of economy and demineralization efficiency, the time of immersion is usually within the range of 0.1 to 24 hours, preferably 0.2 to 12 hours, more preferably 0.5 to 5 hours.

The ratio of the weight of the plant material to be immersed to the weight of the organic acid aqueous solution can appropriately be adjusted depending on the type, concentration, temperature, etc. of the organic acid aqueous solution to be used, and is usually within the range of 0.1 wt % to 200 wt %, preferably 1 wt % to 150 wt %, more preferably 1.5 wt % to 120 wt %. The ratio within the range described above is preferable because the metallic elements and/or nonmetallic elements eluted in the organic acid aqueous solution hardly precipitate from the organic acid aqueous solution and reattachment to the carbon precursor is suppressed. Additionally, the ratio within the range described above makes volume efficiency appropriate and is therefore preferable from an economical viewpoint.

The atmosphere for demineralization is not particularly limited and may be different depending on a method used for the immersion. In the present invention, the demineralization is usually performed in the air.

These operations can repeatedly be performed usually once to five times, preferably three to five times. The demineralization operation is preferably repeatedly performed since various metal salts eluted from the plant-derived raw material and staying around the plant-derived raw material are once removed and further elution of the metal salt is facilitated.

After the demineralization, washing and/or drying can be performed as needed.

Subsequently, the plant material reduced in contents of metallic elements and/or nonmetallic elements as described above is heated at 250 to 800° C. for carbonization so as to obtain a carbon precursor.

In the present invention, if a temperature during carbonization is a temperature exceeding 800° C., the carbon skeleton becomes rigid due to crystallization, which is not preferable for a carbon precursor used for various electronic materials. A temperature during carbonization lower than 250° C. causes a problem of reduced storage safety since a carbon precursor has a high possibility of heat accumulation combustion and is easily oxidized by oxygen in the air. In the present invention, the temperature during carbonization is preferably in the range of 270° C. to 800° C., more preferably in the range of 300° C. to 750° C., further preferably in the range of 400 to 750° C. Carbonization in the range described above is preferable from the viewpoints of suppressing degeneration of the obtained carbon precursor due to oxidation etc. and ensuring storage stability.

Although the heating rate is not particularly limited and differs depending on a method of heating, the heating rate is preferably 1° C./min to 100° C./min, more preferably 1° C./min to 60° C./min. The temperature increase rate within the range described above is preferable since condensation proceeds during carbonization and a favorable yield of the carbon precursor can be obtained. The range described above is also preferable from an economical viewpoint because an operating time of equipment to be used becomes appropriate.

In a control pattern of heating temperature during carbonizing, the temperature can be increased to a desired temperature at one time, or the temperature can be maintained once in the range of 250 to 400° C. before the temperature is increased again to a desired temperature. Maintaining the temperature once within the range described above may facilitate the condensation during carbonization and may contribute to an improvement in carbonization rate, carbon density, and yield of carbide.

Although a retaining time of the heating temperature at the maximum temperature is not particularly limited, the temperature may usually be retained for about 10 minutes to 300 minutes or may preferably be retained for about 30 minutes to 240 minutes.

With regard to atmosphere, the carbonization is preferably performed in an inert gas atmosphere, more preferably in a nitrogen atmosphere. To easily avoid a structural change in carbon material due to oxidization and a reduction in yield of the carbon precursor due to promotion of oxidative degradation during carbonization, an oxidizing gas, i.e. the presence of oxygen, is preferably 1 vol % or less, more preferably 0.5 vol % or less.

An inert gas flow during carbonization is not particular limited and may be usually within the range of 0.001 msec to 1 msec.

A temperature at the time of taking out after carbonization is not particularly limited as long as oxidization due to oxygen in the air does not occur at the temperature, and the carbon precursor is preferably taken out into the air usually at 200° C. or less, more preferably 100° C. or less.

The method of carbonizing is not particularly limited, may be any method of a batch type or a continuous type, and may be any method of an external heat type or an internal heat type.

The obtained carbon precursor can be subjected to a metal removal treatment, a pulverization treatment, and/or a calcination treatment as needed. The carbon precursor can be subjected to gas-phase demineralization with a method comprising a step of heat treatment at 500° C. to 940° C. in an inert gas atmosphere containing a halogen compound such as fluorine, chlorine, bromine, iodine, hydrogen fluoride, hydrogen chloride, hydrogen bromide, iodine bromide, chlorine fluoride (ClF), iodine chloride (ICl), iodine bromide (IBr), and bromine chloride (BrCl) so as to further reduce the oxygen element content.

After the demineralization treatment, the carbon precursor is preferably adjusted in terms of an average particle diameter through a pulverization step and a classification step as needed.

At the pulverization step, the carbon precursor is preferably pulverized such that the average particle diameter ($Dv_{50}$) of the carbonaceous material of the present invention falls within the range of 3 to 30 μm, for example. The average particle diameter ($Dv_{50}$) of the carbonaceous material of the present invention is preferably 3 μm or more, more preferably 4 μm or more, further preferably 5 μm or more. The average particle diameter is preferably 30 μm or less, more preferably 19 µm or less, further preferably 17 µm or less, particularly preferably 16 µm or less, most preferably 15 µm or less.

The plant-derived carbon precursor shrinks by about 0 to 20% depending on conditions of main calcination described later. Therefore, to achieve the average particle diameter of 3 to 30 µm after calcination, the average particle diameter of the plant-derived char carbon precursor is preferably prepared to a particle diameter larger by about 0 to 20% than the desired average particle diameter after calcination. Therefore, the pulverization is preferably performed such that the average particle diameter after pulverization is preferably 3 to 36 µm, more preferably 3 to 22.8 µm, further preferably 3 to 20.4 µm, particularly preferably 3 to 19.2 µm, most preferably 3 to 18 µm.

Since the carbon precursor does not dissolve even though the heat treatment step described later is performed, the pulverization step is not particularly limited in terms of order as long as the pulverization step is performed after the demineralization step. From the viewpoint of reduction in specific surface area of the carbonaceous material, the pulverization step is preferably performed before the calcination step. This is because if the plant-derived carbon precursor is mixed with a volatile organic substance and calcined before pulverization, the specific surface area may not sufficiently be reduced. However, it is not intended to exclude performing the pulverization step after the calcination step.

A pulverizer used for the pulverization step is not particularly limited and, for example, a jet mill, a ball mill, a hammer mill, or a rod mill can be used. A jet mill having a classification function is preferable from the viewpoint of reduced generation of fine powder. If a ball mill, a hammer mill, or a rod mill is used, fine powder can be removed by performing classification after the pulverization process.

The average particle diameter of the carbonaceous material can more accurately be prepared through the classification process. For example, particles having a particle diameter of 1 µm or less can be removed. In this case, the content of particles having a particle diameter of 1 µm or less is preferably 3 vol % or less, more preferably 2.5 vol % or less, further preferably 2.0 vol % or less. The removal of particles having a particle diameter of 1 µm or less is not particularly limited as long as the removal is after pulverization, and is preferably performed simultaneously with classification in pulverization.

Although not particularly limited, examples of a classification method includes classification using a sieve, wet classification, and dry classification, for example. Examples of wet classifiers includes classifiers utilizing principles of gravity classification, inertia classification, hydraulic classification, and centrifugal classification, for example. Examples of dry classifiers include classifiers utilizing principles of sedimentation classification, mechanical classification, centrifugal classification, etc.

The pulverization step and the classification step can also be performed by using one apparatus. For example, the pulverization step and the classification step can be performed by using a jet mill having a dry classification function. An apparatus having a pulverizer and a classifier independent of each other can be used. In this case, pulverization and classification can continuously be performed, or pulverization and classification can discontinuously be performed.

Subsequently, a mixture of the carbon precursor and the volatile organic substance obtained as described above is calcined under an inert gas atmosphere at 800° C. to 1400° C. to obtain the carbonaceous material. The method of manufacturing the carbonaceous material of the present invention may further include a step of calcining a mixture of the carbon precursor derived from coconut shell and the volatile organic substance under an inert gas atmosphere at 800° C. to 1400° C. to obtain the carbonaceous material.

The volatile organic substance is preferably an organic substance that is in a solid state at ordinary temperature and that has a residual carbon ratio of less than 5%. The volatile organic substance is preferably a substance generating a volatile substance (e.g., hydrocarbon-based gas or tar) capable of reducing the oxygen element content of the carbonaceous material manufactured from the plant-derived carbon precursor. In the volatile organic substance, the content of the volatile substance (e.g., a hydrocarbon-based gas or tar component) capable of reducing the oxygen element content is not particularly limited.

Examples of the volatile organic substance include thermoplastic resins and low-molecular organic compounds, for example. Specifically, examples of the thermoplastic resins include polystyrene, polyethylene, polypropylene, poly (meth) acrylic acid, poly (meth) acrylic acid ester, etc. In this description, (meth) acryl is a generic term for methacryl and acryl. Examples of the low-molecular organic compounds include toluene, xylene, mesitylene, styrene, naphthalene, phenanthrene, anthracene, pyrene, etc. Since it is preferable that the substance volatilizes at the calcination temperature and does not oxidize or activate the surface of the carbon precursor when thermally decomposed, the thermoplastic resin is preferably polystyrene, polyethylene, or polypropylene. From the viewpoint of safety, it is preferable that the low-molecular weight organic compound has low volatility at ordinary temperature and, therefore, naphthalene, phenanthrene, anthracene, pyrene etc. are preferable.

The residual carbon ratio is measured by quantifying a carbon content of an ignition residue after ignition of a sample in an inert gas. With regard to the ignition, about 1 g of a volatile organic substance (the accurate weight is defined as W1 (g)) is put into a crucible and the crucible is heated in an electric furnace at the temperature increase rate of 10° C./min from ordinary temperature to 800° C. while flowing 20 liters of nitrogen per minute, and is then ignited at 800° C. for one hour. A residue in this case is regarded as the ignition residue, and the weight thereof is defined as W2 (g).

For the ignition residue, elemental analysis is performed in accordance with the method defined in JIS M8819 to measure a weight proportion P1 (%) of carbon. The residual carbon ratio P2 (%) is calculated by the following equation.

$$P_2 = P_1 \times \frac{W_2}{W_1} \qquad [\text{Eq. 1}]$$

The mixture calcined in this embodiment is not particularly limited and is preferably a mixture containing the carbon precursor and the volatile organic substance at a weight ratio of 97:3 to 40:60. The mixed amounts of the carbon precursor and the volatile organic substance are more preferably 95:5 to 60:40, further more preferably 93:7 to 80:20. For example, when the volatile organic substance is three parts by weight or more, the oxygen element content can sufficiently be reduced. On the other hand, if the volatile organic substance is excessive in amount, the effect of reducing the oxygen element content is saturated and the volatile organic substance may wastefully be consumed, which is not preferable.

Mixing of the carbon precursor and the volatile organic substance may be performed either before the pulverization step or after the pulverization step.

In the case of mixing before the pulverization step, pulverization and mixing can be performed at the same time by supplying the carbon precursor and the volatile organic substance simultaneously to the grinding apparatus while being weighed.

In the case of mixing after the pulverization step, a mixing method can be implemented by using any known mixing method that is a technique in which both are uniformly mixed. Although the volatile organic substance is preferably mixed in a form of particles, the shape and particle diameter of the particles are not particularly limited. From the viewpoint of uniformly dispersing the volatile organic substance in the pulverized carbon precursor, the average particle diameter of the volatile organic substance is preferably 0.1 to 2000 μm, more preferably 1 to 1000 μm, further preferably 2 to 600 μm.

The mixture described above may contain a component other than the carbon precursor and the volatile organic substance. For example, the mixture can contain natural graphite, artificial graphite, a metal-based material, an alloy-based material, or an oxide-based material. The content of the other component is not particularly limited and is preferably 50 parts by weight or less, more preferably 30 parts by weight or less, further preferably 20 parts by weight or less, most preferably 10 parts by weight or less based on 100 parts by weight of the mixture of the carbon precursor and the volatile organic substance.

At the calcination step in the manufacturing method of this embodiment, the mixture of the carbon precursor and the volatile organic substance is calcined at 800 to 1400° C.

The calcination step may comprise
(a) a calcination step of calcining the pulverized mixture at 800 to 1400° C. for main calcination, or
(b) a calcination step of preliminarily calcining the pulverized mixture at 350° C. or higher and less than 800° C. and subsequently performing main calcination at 800 to 1400° C.

An example of procedures of preliminary calcination and main calcination will hereinafter be described as an embodiment of the present invention; however, the present invention is not limited thereto.

(Preliminary Calcination)

The preliminary calcination step in this embodiment can be performed, for example, by calcining the pulverized mixture at 350° C. or higher and less than 800° C. Volatile components (such as $CO_2$, $CO$, $CH_4$, and $H_2$) and tar components can be removed by the preliminary calcination step. The generation of volatile components and tar components at the main calcination step performed after the preliminary calcination step can be reduced, and a burden on a calciner can be reduced.

The preliminary calcination step is preferably performed at 350° C. or higher, more preferably at 400° C. or higher. The preliminary calcination step can be performed according to a usual preliminary calcination procedure. Specifically, the preliminary calcination can be performed in an inert gas atmosphere. Examples of the inert gas can include nitrogen, argon, etc. The preliminary calcination may be performed under reduced pressure and can be performed at 10 kPa or less, for example. The preliminary calcination is not particularly limited in terms of time and can be performed within the range of 0.5 to 10 hours, more preferably 1 to 5 hours, for example.

(Main Calcination)

The main calcination step can be performed according to a usual main calcination procedure. By performing the main calcination, a carbonaceous material for a nonaqueous electrolyte secondary battery can be obtained.

A specific temperature of the main calcination step is 800 to 1400° C., preferably 1000 to 1350° C., more preferably 1100 to 1300° C. The main calcination is performed under an inert gas atmosphere. Examples of the inert gas can include nitrogen, argon, etc., and the main calcination can be performed in an inert gas containing a halogen gas. The main calcination step can be performed under reduced pressure and can be performed at 10 kPa or less, for example. The preliminary calcination step is not particularly limited in terms of time and can be performed for 0.05 to 10 hours, preferably 0.05 to 8 hours, more preferably 0.05 to 6 hours, for example.

The carbonaceous material of the present invention obtained in this way can preferably be used, for example, for electronic materials for conductive materials, capacitor electrodes, condenser electrodes, storage battery electrodes, and nonaqueous electrolyte secondary battery electrodes.

EXAMPLES

The present invention will hereinafter more specifically be described with examples; however, the present invention is not limited to these examples.
[Measurement of Metallic Element/Nonmetallic Element Contents]

The metallic element contents in the carbonaceous materials obtained in Examples and Comparative Examples were evaluated by using an X-ray fluorescence spectrometer (ZSX Primus g manufactured by Rigaku Corporation).
[Oxygen Element Content]

Elemental analysis was performed by using the oxygen/nitrogen/hydrogen analyzer EMGA-930 manufactured by HORIBA, Ltd.

A detection method for oxygen of the apparatus is an inert gas fusion-non-dispersive infrared (NDIR) absorption method calibrated with an (oxygen/nitrogen) Ni capsule, $TiH_2$ (H standard sample), and SS-3 (N, O standard sample), and 20 mg of a sample having moisture content measured at 250° C. for about 10 minutes as a pretreatment was put into an Ni capsule and measured after degasifying for 30 seconds in the elemental analyzer. The test was performed by analyzing three specimens, and an average value was used as an analysis value.
[Amount of Moisture Absorption]

Ten grams of a carbonaceous material pulverized to a particle diameter of about 5 to 50 μm was put into a sample tube and preliminarily dried at 120° C. for two hours under the reduced pressure of 133 Pa and was transferred to a glass petri dish of 50 mm in diameter and exposed in a constant temperature and humidity chamber at 25° C. and the humidity of 50% for a predetermined time. One gram of the sample was taken and heated to 250° C. in Karl Fischer (manufactured by Mitsubishi Chemical Analytech) to measure an amount of water under a nitrogen gas stream.
[Carbonization Conditions of Plant Raw Material for Obtaining Carbon Precursor]

Twenty grams of the plant raw material was put into a crucible, raised in temperature to 700° C. at 10° C./min under a flow rate of 3 L/min (0.012 m/sec) of a nitrogen flow with an oxygen content of 15 ppm by using a KTF 1100 furnace (inner diameter: 70 mm) manufactured by Koyo Thermo Systems, retained for 60 minutes, then cooled for six hours, and taken out at 50° C. or lower.
[Calcination Conditions of Carbon Precursor for Obtaining Carbonaceous Material]

The carbon precursor was mixed with 10 parts by weight of polystyrene (manufactured by Sekisui Plastics, average particle diameter: 400 μm, residual carbon ratio: 1.2%), then raised in temperature to 1270° C. at the temperature increase rate of 12° C. per minute under 5 L per minute of a nitrogen flow in a rapid temperature-raising furnace manufactured by MOTOYAMA, then retained for 11 minutes, and naturally cooled. It was confirmed that the furnace temperature had lowered to 200° C. or less before the carbonaceous material was taken out from the furnace.

Example 1

Hundred grams of coconut shell chips of about 5 mm square was immersed in 150 g of a 7.6 wt % citric acid aqueous solution, increased in temperature to 95° C., heated for 24 hours, then cooled to room temperature, and subjected to deliquoring through filtration for demineralization. This demineralization operation was repeated three times. The demineralized coconut shell was dried for 24 hours at 80° C. under vacuum of one Torr. The coconut shell chips refined in this way were carbonized according to the carbonization conditions described above to obtain a carbon precursor. Subsequently, the obtained carbon precursor was calcined according to the calcination conditions described above to obtain a carbonaceous material. The contents of metallic elements and nonmetallic elements contained in the obtained carbonaceous material, the oxygen element content, and the amount of moisture absorption were measured according to the measurement conditions described above. The results are shown in Table 1.

Example 2

A carbonaceous material was produced and evaluated as in Example 1 except for setting the number of repetitions of the demineralization operation to one in Example 1. The results are shown in Table 1.

Example 3

A carbonaceous material was produced and evaluated as in Example 1 except for setting the demineralization time to four hours and the number of repetitions of demineralization operation to five in Example 1. The results are shown in Table 1.

Comparative Example 1

A carbonaceous material was produced and evaluated as in Example 2 except for using the carbon precursor obtained by performing the same demineralization operation for a carbide obtained after carbonizing the coconut shell chips without demineralizing the coconut shell chips in Example 2. The results are shown in Table 1.

Comparative Example 2

A carbonaceous material was produced and evaluated as in Example 1 except that the demineralization operation was not performed in Example 1. The results are shown in Table 1.

Comparative Example 3

A carbonaceous material was produced and evaluated as in Example 3 except that polystyrene was not used at the time of calcination. The results are shown in Table 1.

Reference Example 1

A negative electrode of a lithium secondary battery was fabricated according to the following procedure by using each of the carbonaceous materials obtained in Example 1 to evaluate initial battery capacity and charge/discharge efficiency.

By mixing 94 parts by mass of the prepared carbonaceous material, 6 parts by mass of PVDF (polyvinylidene fluoride), and NMP (N-methylpyrrolidone), a slurry was obtained. The obtained slurry was applied to a copper foil having a thickness of 14 μm, dried, and then pressed to obtain an electrode having a thickness of 60 μm. The density of the obtained electrode was 0.9 to 1.1 g/cm$^3$.

The prepared electrode was used as an action electrode, and metallic lithium was used as a counter electrode and a reference electrode. For a solvent, ethylene carbonate and methyl ethyl carbonate were mixed and used at a volume ratio of 3:7. In this solvent, 1 mol/L of $LiPF_6$ was dissolved and used as an electrolyte. A glass fiber non-woven fabric was used for a separator. A coin cell was fabricated in a glove box under an argon atmosphere.

For the lithium secondary battery configured as described above, a charge/discharge test was performed by using a charge/discharge test apparatus ("TOSCAT" manufactured by Toyo System). Doping of lithium was performed at a rate of 70 mA/g based on the active material mass, and the doping was performed until 0 mV based on the lithium potential. A constant voltage of 0 mV based on the lithium potential was applied until a current value of 0.02 mA, and the doping was terminated. The capacity (mAh/g) in this case was defined as a charge capacity. Subsequently, dedoping was performed at a rate of 70 mA/g based on the active material weight until 1.5 V based on the lithium potential, and a capacity of discharge in this case was defined as a discharge capacity. The percentage of the discharge capacity and the charge capacity was defined as the charge/discharge efficiency (initial charge/discharge efficiency) and used as an index of the utilization efficiency of lithium ions in the battery.

The results are shown in Table 2.

Reference Examples 2 to 6

As in Reference Example 1, a negative electrode of a lithium secondary battery was fabricated by using each of the carbonaceous materials obtained in Examples 2 and 3 and Comparative Examples 1, 2, and 3 to evaluate initial battery capacity and charge/discharge efficiency. The results are shown in Table 2.

TABLE 1

| | | Contents of metallic and nonmetallic elements contained in carbonaceous material | | | | Oxygen element | Amount of moisture |
|---|---|---|---|---|---|---|---|
| | | K (ppm) | Ca (ppm) | Mg (ppm) | P (ppm) | content (wt %) | absorption (ppm) |
| Examples | 1 | 49 | 41 | 22 | 129 | 0.21 | 8900 |
| | 2 | 78 | 89 | 47 | 141 | 0.24 | 11300 |
| | 3 | 19 | 24 | 10 | 120 | 0.20 | 7800 |
| Comparative | 1 | 2300 | 341 | 176 | 372 | 0.43 | 24100 |
| Examples | 2 | 10303 | 372 | 201 | 422 | 0.79 | 29400 |
| | 3 | 18 | 23 | 10 | 116 | 0.55 | 42080 |

TABLE 2

| | | Carbonaceous material used | Battery characteristics | | | |
|---|---|---|---|---|---|---|
| | | | Charge (mAh/g) | Discharge (mAh/g) | Irreversible capacity (mAh/g) | Efficiency (%) |
| Reference Examples | 1 | Example 1 | 422 | 356 | 66 | 84.4 |
| | 2 | Example 2 | 426 | 355 | 71 | 83.3 |
| | 3 | Example 3 | 411 | 352 | 59 | 85.6 |
| | 4 | Comparative Example 1 | 439 | 346 | 93 | 78.8 |
| | 5 | Comparative Example 2 | 441 | 337 | 104 | 76.4 |
| | 6 | Comparative Example 3 | 437 | 349 | 88 | 79.9 |

As shown in Table 1, respective values of the content of the metallic elements, the content of the nonmetallic elements, the oxygen element content, and the amount of moisture absorption in the carbonaceous material of the present invention were lower than those of the carbonaceous materials not according to the present invention. As shown in Table 2, when the carbonaceous material of the present invention was used, the lithium secondary batteries having excellent battery characteristics were obtained.

Therefore, it is understood that the carbonaceous material of the present invention is very useful for electronic materials.

The invention claimed is:

1. A carbonaceous material, comprising a carbide of a carbon precursor derived from coconut shell, wherein:
   the carbonaceous material has a potassium content of 100 ppm or less and a calcium content of 100 ppm or less; and
   the carbonaceous material has an oxygen element content of 0.25 wt % or less.

2. The carbonaceous material according to claim 1, wherein the carbonaceous material has a magnesium content of 50 ppm or less.

3. The carbonaceous material according to claim 1, wherein the carbonaceous material has a phosphorus content of 150 ppm or less.

4. A method of manufacturing the carbonaceous material according to claim 1, the method comprising:
   reducing contents of metallic elements, nonmetallic elements, or both, in a coconut shell by immersing the coconut shell in an organic acid aqueous solution; and
   subsequently heating the coconut shell reduced in contents of metallic elements, nonmetallic elements, or both, at 250 to 800° C. for carbonization, to obtain a carbon precursor, and
   calcining a mixture of the carbon precursor obtained and a volatile organic substance in an inert gas atmosphere at 800° C. to 1400° C. to obtain the carbonaceous material.

5. An electronic material, comprising a carbide of a carbon precursor derived from coconut shell, wherein:
   the carbide has a potassium content of 100 ppm or less and a calcium content of 100 ppm or less; and
   the carbide has an oxygen element content of 0.25 wt % or less.

\* \* \* \* \*